Nov. 17, 1970  W. McGUIRE  3,541,295
WELDING TOGETHER OF RAILWAY TRACK RAILS AND LIKE
ELONGATED METAL SECTIONS

Filed July 28, 1967  4 Sheets-Sheet 1

William McGuire
INVENTOR

By: Stevens, Davis, Miller & Mosher
ATTORNEYS

Nov. 17, 1970  W. McGUIRE  3,541,295
WELDING TOGETHER OF RAILWAY TRACK RAILS AND LIKE
ELONGATED METAL SECTIONS
Filed July 28, 1967  4 Sheets-Sheet 2

William McGuire
INVENTOR

By: Stevens, Davis, Miller & Mosher
ATTORNEYS

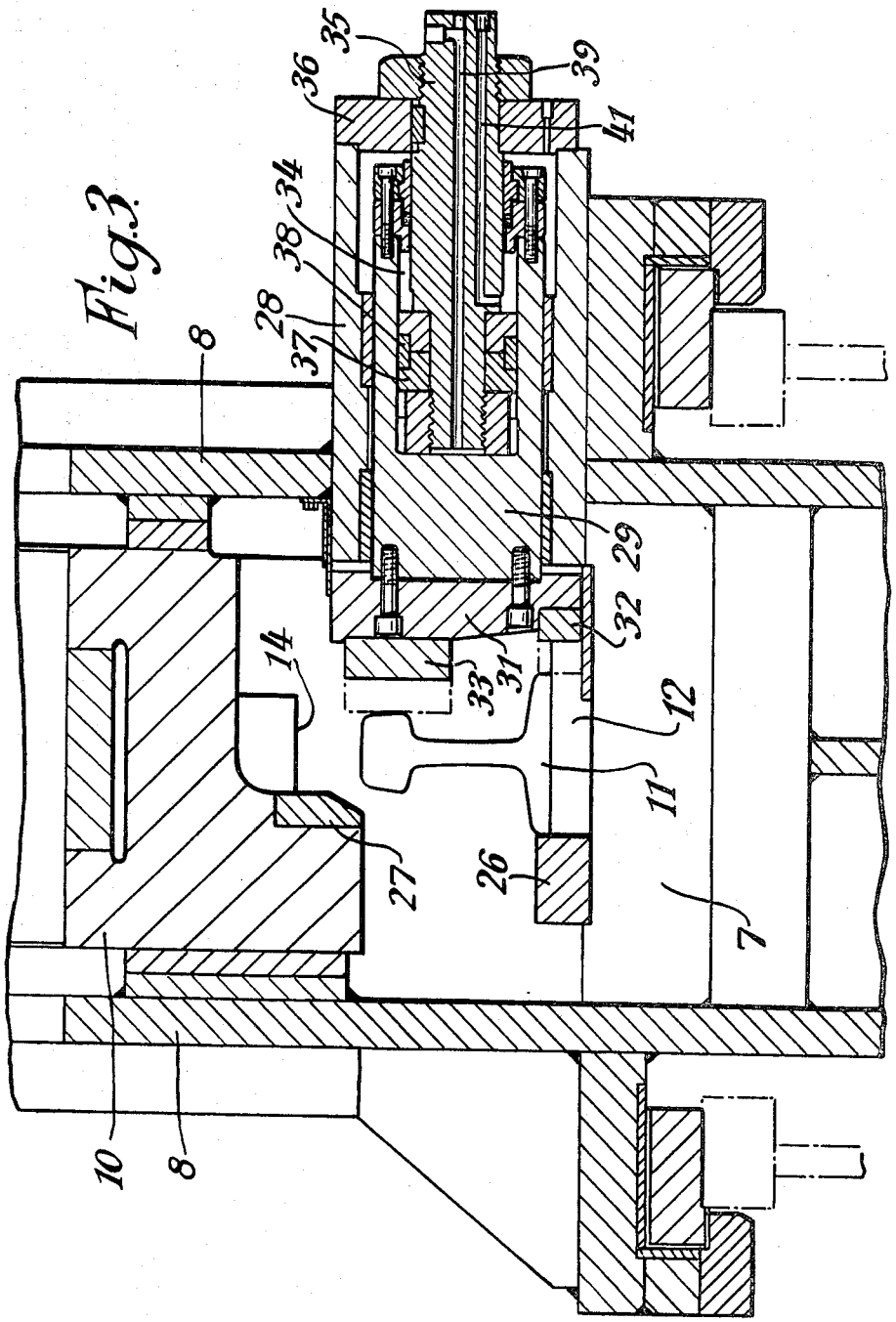

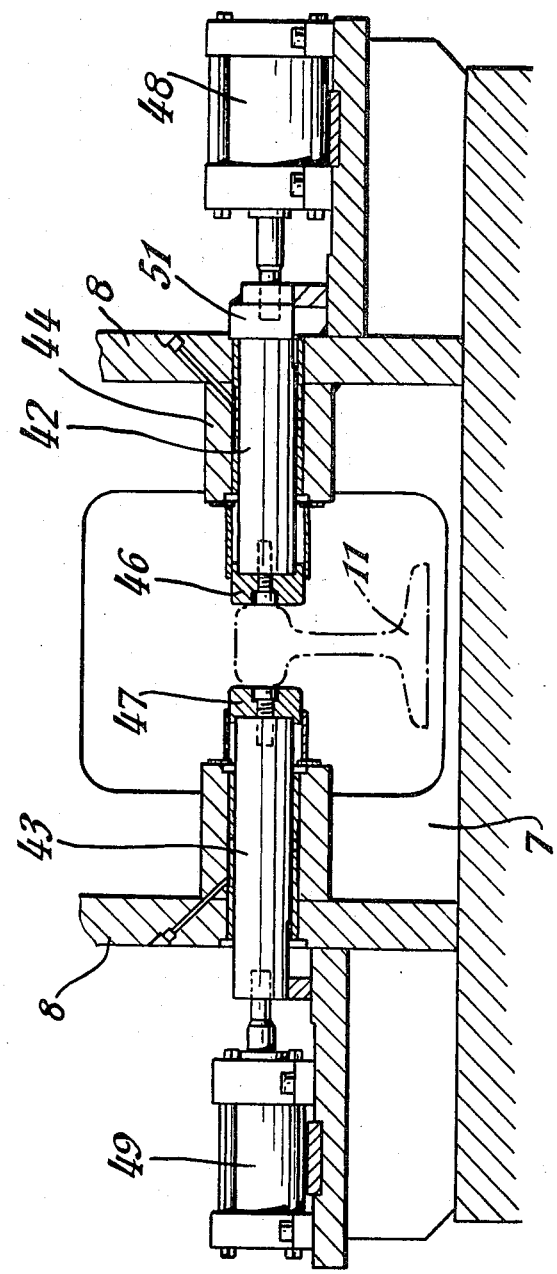

United States Patent Office 3,541,295
Patented Nov. 17, 1970

3,541,295
WELDING TOGETHER OF RAILWAY TRACK RAILS AND LIKE ELONGATED METAL SECTIONS
William McGuire, Inverness, Scotland, assignor to A. I. Welders Limited, Inverness, Scotland
Filed July 28, 1967, Ser. No. 656,871
Claims priority, application Great Britain, Nov. 10, 1966, 50,426/66
Int. Cl. B23k *11/02*
U.S. Cl. 219—101                                8 Claims

ABSTRACT OF THE DISCLOSURE

In the welding together in end-to-end relation of railway rails or like elongated metal sections the said sections are clamped in the platens of a resistance welding machine so as to ensure that their ends are in proper alignment, one clamping means close to the end of each section engaging each side of the seciton at points spaced across its width so as to correct any twist, and another clamping means spaced from the said end holding the portion of the section between the two clamping means truly parallel to the direction of movement of the machine platens during the welding operation.

---

This invention relates to the welding together of railway track rails and like elongated metal sections. Such welding operations are normally performed in resistance welding machines in which the ends of two sections to be welded together are clamped respectively in two relatively movable platens of the machine and brought close together so that when a high electric current is passed between them flashing takes place to soften the metal, the ends then being butted together under pressure to form a weld.

The rails or other sections to be welded, when produced by a rolling operation are frequently twisted at their ends so that, when the ends of two sections to be welded are brought together, they are not properly aligned one with the other, and the clamping of the sections each at a single point close to the weld gap does not bring them truly into alignment. A satisfactory weld cannot therefore be made. Hitherto, it has been found necessary either to deform the sections by hand or remove the twist, or to cut off the twisted ends, the former operation being time consuming and the latter operation resulting in a waste of material.

It is the object of the present invention to overcome these disadvantages.

According to one aspect of the invention a method of securing railway rails or like elongated metal sections in the platens of a resistance welding machine so as to provide accurate alignment of the ends thereof to be welded together consists in clamping two sections each in one of the relatively movable platens of the resistance welding machine by two clamping assemblies one of which clamps a section close to its end against abutments fixed against movement in the direction of the clamping load thereon and engaging one side of the said section at points spaced apart in the direction of the width of that side and the other of which clamps the same side of the said section against another abutment at a position spaced from the end of the section, the relative positions of the said abutments with respect to each other being such that the end of the section is held in a predetermined angular position in a plane normal to the direction of movement of the machine platens and the portion between the two clamping positions is held truly parallel to said direction of movement.

According to another aspect of the invention, clamping means for securing railway rails and like elongated metal sections in the platens of a resistance welding machine during the welding together of the ends of the said sections comprise, in each platen of the welding machine, a first clamping assembly to engage the section close to its end and comprising two abutments fixed against movement in the direction of the clamping load thereon and positioned to engage one side of the section at points spaced apart in the direction of the width of that side and means for pressing the section against said abutments, and a second clamping assembly at a position spaced from the end of the section and comprising an abutment to engage the same side of the section and means for pressing the section against that abutment, the positions of the three abutments relative to each other being such that the end of the section is held in a predetermined angular position in a plane normal to the direction of relative movement of the machine platens and the portion between the two clamping assemblies is held truly parallel to said direction of movement.

The invention is particularly useful in connection with the welding together of railway track rails, and the accompanying drawings show, by way of example, the application of the invention to a platen of a resistance welding machine for welding together lengths of such track rail.

In the drawings:

FIG. 3 is a transverse section, on a larger scale, corresponding to the lower part of FIG. 2; and FIG. 4 is a transverse section, on the same scale as FIG. 3, taken on the line 4—4 of FIG. 1.

Figure 1:
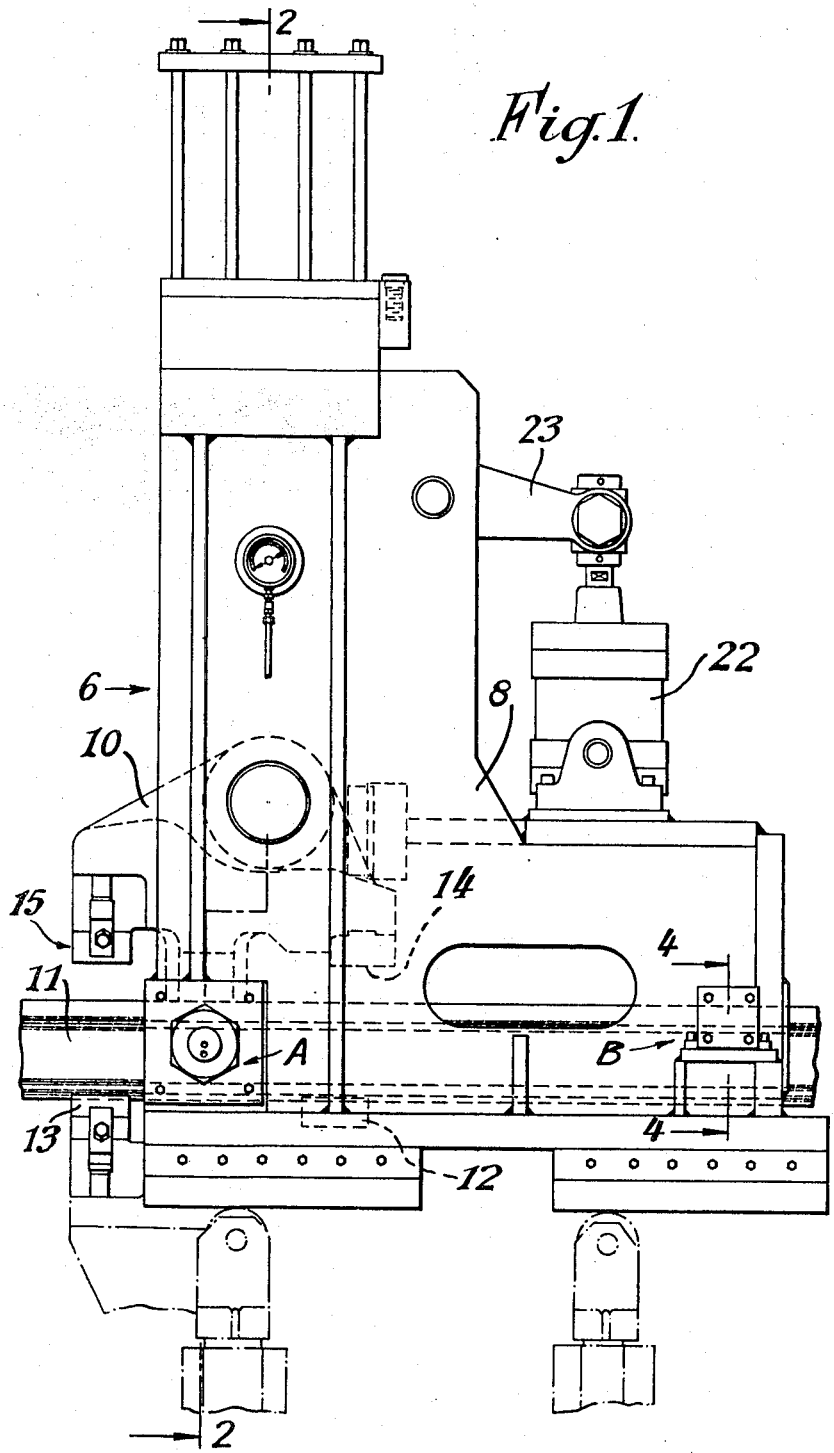
FIG. 1 is a side elevation of the welding machine platen.

Referring to the drawings, the welding machine platen comprises a frame 6 including a platen 7 between side walls 8 and between which is also mounted a vertically movable slide 9 on which is pivotally mounted a clamp member 10 adapted to provide the main clamping load on a rail section to resist the longitudinal thrust applied to it during the welding operation. The platen 7 has mounted on it two rigid supports for the base of a length of rail 11, shown in the drawings as a flat-base rail, one such support, which is spaced from the end of the rail, being shown at 12, and the other, which is close to the end of the rail, and which is shown at 13, constituting an electrode block. The clamp member 10 carries a downwardly facing surface 14 opposite to the rigid support 12 and a second electrode block 15 opposite the electrode block 13. Downward clamping pressure is applied through the slide 9 to the clamp member 10 by a fluid pressure intensifier 16 of known form in which air pressure acting on a piston 17 is applied, by a ram 18 of smaller diameter than the piston 17, to liquid in a chamber 19 between a fixed piston 20 and a cylinder 21 formed on slide 99, the ram 18 being also of smaller diameter than the piston 20. The clamp member 10 may also be moved downwardly under light pressure by the action of compressed air in air cylinder 22 (FIG. 1) a piston in which acts through lever arms 23 on the slide 9. The electrode blocks 13 and 15 provide for the connection of the rail to a source of electric current. Between the electrode block 13 and the rigid support 12 there is provided a first laterally operating clamping assembly the position of which is indicated by the letter A in FIG. 1, and a second laterally operating clamping assembly is provided at position B spaced along the rail 11 from the position A.

Figure 2:
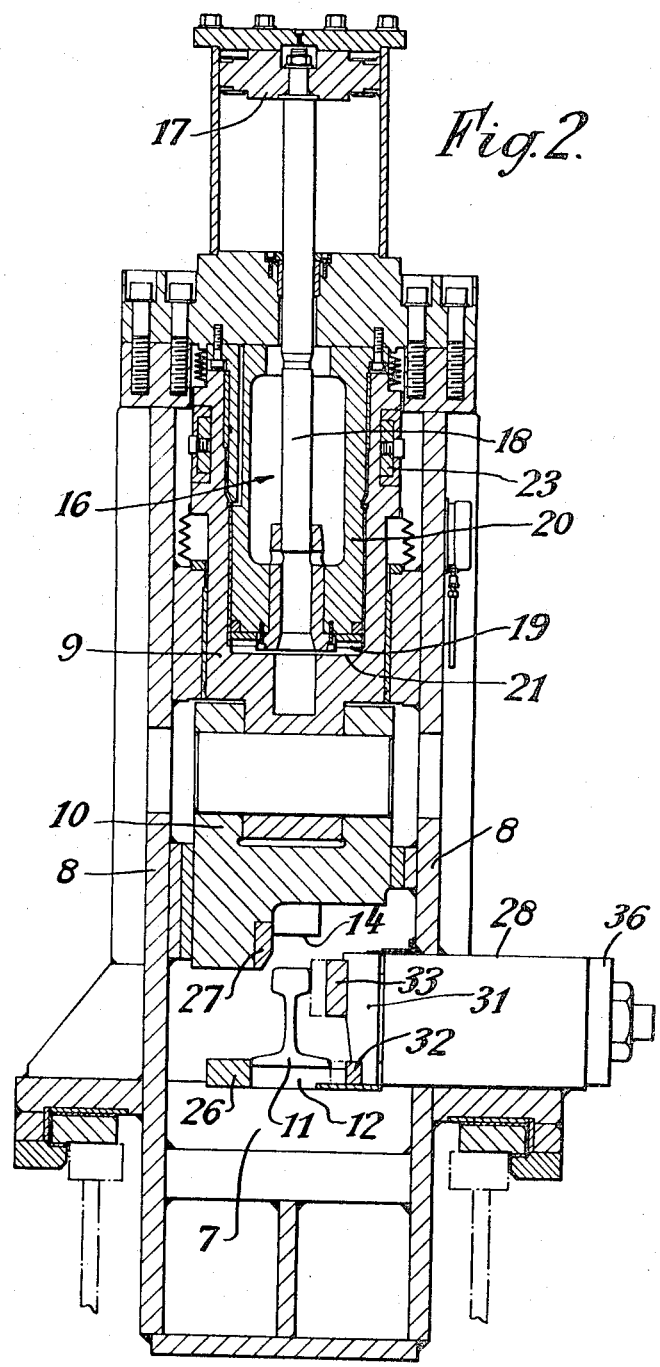
FIG. 2 is a transverse section on the line 2—2 of FIG. 1.

Referring to FIGS. 2 and 3 of the drawings, the first clamping assembly at A comprises an abutment block 26 rigidly fixed to the platen 7 so as to stand up therefrom at one side of a rail 11 supported in the platen, and a second abutment block 27 rigidly mounted on a laterally offset downward extension of the clamp member 10 so as to project below the surface 14 and electrode block 15 on that clamp member, the abutment blocks 26 and 27 having their rail-engaging surfaces so relatively positioned in a direction normal to the length of the rail that, with a rail of predetermined dimensions, the block 26 engages the side of the rail base and the block 27 engages the side of the rail head when the centre plane of the rail extending from its base to its head is truly vertical.

In the side wall 8 of the frame 6 on the opposite side of the rail to the abutment blocks 26 and 27 there is rigidly mounted a tubular guide 28 in which is slidably mounted a ram 29 (FIG. 3) on the inner end of which is secured a mounting block 31 carrying a second pair of abutment blocks 32 and 33, the abutment block 32 being opposite to the abutment block 26 and the abutment block 33 being opposite to the abutment block 27. The abutment blocks 32 and 33 are in the same relation to each other, in a lateral sense, as are the abutment blocks 26 and 27, so that, when the ram 29 is moved inwardly to bring all four abutment blocks into engagement with a rail, the said rail is held with the centre longitudinal plane which extends from its base to its head in a truly vertical position. Any suitable means may be provided for preventing the mounting block 31 from rotating about the axis of the ram 29.

The ram 29 is recessed coaxially at its outer end, as shown at 34, and a stem 35, fixed to a cover plate 36 itself fixed to the outer end of the tubular guide 28, extends into the recess 34, the stem carrying a piston 37 slidably engaging the peripheral wall of the recess and carrying a packing ring 38 to provide a fluidtight sliding joint with the said wall. Passage means 39 and 41 in the stem 35 provide for the connection of the spaces in the recess 34 on the inner and outer sides of the piston 37 respectively to a source of fluid pressure (not shown) so that the abutment blocks 32 and 33 can be moved both inwardly and outwardly by fluid pressure. The clamp member 10 is shown in FIGS. 2 and 3 in the raised position and the clamping assembly is open.

Referring to FIG. 4, the clamping assembly shown at B in FIG. 1 comprises two horizontally opposed slide members 42 and 43 mounted respectively in tubular guides 44 and 45 fixed to the side walls 8 of the frame 10, the slide members 42 and 43 carrying respectively abutment blocks 46 and 47 to engage opposite sides of the head of a rail 11. Each of the slide members 42 and 43 is acted on at its outer end by the ram of a double-acting fluid pressure operated ram-and-cylinder device arranged to exert inward thrust on the said slide member for clamping and to retract it outwardly to release a section after welding. The ram-and-cylinder device acting on the slide member 42, which is shown at 48, has a greater effective area than the ram-and cylinder device 49 acting on the slide member 43, and the slide member 42 has its inward movement limited by an enlarged portion 51 at the outer end thereof engaging the outer side of the wall 8, the position of the said enlarged portion 51 on the slide member 42 being such that, when it engages the side wall 8, the face of the abutment block 46 which engages the rail is in the same plane as the rail-engaging face of the abutment block 27 at the position A. Thus, when both ram-and-cylinder devices 48 and 49 are actuated to apply inward thrust to the slide members 42 and 43, the slide member 42 is moved inwardly to a fixed datum position and the slide member 43 is moved only far enough to press the rail 15 against the abutment block 46, so that the portion of the rail between the positions A and B, being positively located at both those positions, is held in true alignment with the direction of relative movement of the machine platens. The parts are shown in this position in FIG. 4.

The abutment blocks 26, 27, 32, 33, 46 and 47 may be readily detachable and replaceable to enable a welding machine to be used for welding rails of different sizes and configurations.

The clamping of a rail by the clamping means according to the invention is carried out in the following manner. After the rail 11 has been fed into the machine, the vertically movable clamp member 10 is brought down under light pressure on to the top of the rail by activating the air cylinder 22, thus positioning the abutment block 27 opposite the head of the rail. The ram 29 and the slide members 42 and 43 are then moved inwardly to clamp the rail at both positions A and B so that the end of the rail is correctly oriented in a plane normal to the direction of relative movement of the platens and the portion thereof between the positions A and B is held parallel to that direction of relative movement. Consequently, when the platens are caused to approach each other to effect the weld, the rail ends are accurately registered one with the other and a satisfactory welded joint can be made without the necessity for either cutting off parts of the rails or twisting or bending them manually.

I claim:

1. A method of welding, wherein an alongated metal section is secured in a platen of a resistance welding machine in order to correct twists in the end to be welded, and to accurately align same with the end to be welded of a similarly secured section, comprising clamping said section at a first clamping position located effectively close to its end against first and second abutments fixed against movement in the direction of the clamping load thereon, said abutments engaging one side of said section at points perpendicularly spaced with respect to the longitudinal axis of said section; and clamping said section at a second clamping position spaced from said end to be welded against a third abutment, said first and second abutments being positioned with respect to each other such that said end to be welded is held in a predetermined angular position in a plane normal to the direction of movement of the platens of said resistance welding machine and said first, second, and third abutments being positioned with respect to each other such that the portion of said section between said first and second clamping positions is held parallel to said direction of movement, and welding said end to the end of said similarly secured section.

2. A resistance welding machine, including clamping means for accurately securing an alongated section in a platen thereof during the welding of an end of said section to the end to be welded of a similarly positioned section, whereby a twist in said end to be welded is corrected, comprising means for welding said ends together, a first clamping assembly adapted to engage said section effectively close to said end to be welded, said first clamping assembly comprising first and second abutments fixed against movement in the direction of the clamping load thereon and adapted to engage one side of said section at points perpendicularly spaced apart with respect to the longitudinal axis of said section, and means for pressing said section against said abutments; and a second clamping assembly spaced from said end to be welded, said second clamping assembly comprising a third abutment adapted to engage the same side of said section as said first and second abutments and means in the same transverse plane as said third abutment for pressing said section against said third abutment; the relative positioning of said first and second abutments being such that said end to be welded is held in a predetermined angular position in a plane normal to the direction of movement of the platens of said resistance welding machine during the welding operation and the relative positions of said first, second, and third abutments being such that the portion of said section between the two clamping assemblies parallels said direction of movement.

3. Welding machine according to claim 2 wherein said first abutment is fixed to the platen and said second abutment is fixed to a movable member of a further clamping assembly; said further clamping assembly being adapted to clamp said section in a direction normal to the direction of clamping of said first and second clamping assemblies.

4. Welding machine according to claim 2 wherein the means in said first clamping assembly for pressing said section against said fixed abutments comprises an additional pair of abutments, said pair of abutments lying directly opposite to said first and second abutments, and mounted on a member movable towards said first and second abutments by fluid pressure means.

5. Welding machine according to claim 2 wherein said third abutment is mounted on a first slide member adapted to be moved inwardly under fluid pressure to a predetermined position relative to said first and second abutments, and said means for pressing said section against said third abutment comprises a further abutment mounted on a second slide member which is movable inwardly by fluid pressure means; the thrust of said first slide member being greater than the thrust of said second slide member.

6. A method of welding wherein an elongated metal section is secured in a platen of a resistance welding machine in order to correct a twist in the end thereof to be welded, and to accurately align same with the end to be welded of a similarly positioned section, comprising immobilizing said section at a first position effectively close to said end to be welded in a predetermined angular orientation with respect to a plane normal to the direction of movements of said platen, and transversely immobilizing said section with respect to said platen in at least one other position spaced from said end to be welded; such that the portion of said section between said first and second positions is held parallel to the direction of movement of the platens of said resistance welding machine; and welding said end to the end of said similarly secured section.

7. The method of claim 6 comprising immobilizing said section at one other position spaced from said end to be welded.

8. A resistance welding machine, including clamping means for accurately securing an elongated section in a of to the end to be welded of a similarly positioned sec- platen of said machine during the welding of an end thereto- tion, wherein a twist in said end is corrected, comprising the combination of a first clamping means adapted to impart a predetermined angular orientation to said section with respect to a plane normal to the direction of movement of said platen, said means being located effectively close to said end to be welded, and second clamping means spaced from said end to be welded and adapted to transversely engage said section; said first and second clamping means cooperating to hold the portion of said section between said clamping means parallel to said direction of movement.

References Cited

UNITED STATES PATENTS

| 2,297,893 | 10/1942 | Jones | 219—101 |
| 2,302,420 | 11/1942 | Chapman | 219—101 |
| 2,467,536 | 4/1949 | Schlatter | 219—101 |
| 925,630 | 6/1909 | Goldschmidt et al. | 228—44 X |
| 1,433,600 | 10/1922 | Brown et al. | 219—101 X |
| 2,787,698 | 4/1957 | Schlatter et al. | 219—101 |
| 3,036,204 | 5/1962 | Stieglitz et al. | 219—101 |
| 3,204,079 | 8/1965 | Cox | 219—101 |

JOSEPH V. TRUHE, Primary Examiner

L. A. SCHUTZMAN, Assistant Examiner

U.S. Cl. X.R.

219—161; 228—44